United States Patent

Nakano et al.

[11] Patent Number: 5,845,430
[45] Date of Patent: Dec. 8, 1998

[54] LEADER FOR FLY FISHING AND PROCESS FOR PRODUCING THE SAME

[75] Inventors: Eishou Nakano; Sueo Watanabe; Toshiya Mizuno; Seiichi Ohira; Takuo Sekita, all of Ibaraki-ken, Japan

[73] Assignee: Kureha Kagaku Kogyo Kabushiki Kaisha, Japan

[21] Appl. No.: 677,311

[22] Filed: Jul. 9, 1996

[30] Foreign Application Priority Data

Jul. 12, 1995 [JP] Japan ................................... 7-199152
Jul. 18, 1995 [JP] Japan ................................... 7-203808

[51] Int. Cl.[6] ................................................. A01K 91/00
[52] U.S. Cl. ............................................................. 43/44.98
[58] Field of Search ............................................. 43/44.98

[56] References Cited

U.S. PATENT DOCUMENTS

| | | |
|---|---|---|
| 3,864,865 | 2/1975 | Swisher . |
| 4,353,960 | 10/1982 | Endo ..................................... 43/44.98 |
| 4,606,144 | 8/1986 | Jasaki ..................................... 43/44.98 |

FOREIGN PATENT DOCUMENTS

| | | | |
|---|---|---|---|
| 29503682 | 6/1995 | European Pat. Off. . | |
| 0059115 | 4/1985 | Japan | ................................... 43/44.98 |
| 0181314 | 9/1985 | Japan | ................................... 43/44.98 |
| 0209008 | 10/1985 | Japan | ................................... 43/44.98 |
| 0209009 | 10/1985 | Japan | ................................... 43/44.98 |
| 2186732 | 8/1987 | Japan | ................................... 43/44.98 |
| 2223315 | 10/1987 | Japan | ................................... 44/44.98 |
| 2268811 | 11/1987 | Japan | ................................... 44/44.98 |
| 2276019 | 11/1987 | Japan | ................................... 43/44.98 |
| 3112717 | 5/1988 | Japan | ................................... 43/44.98 |
| 3159527 | 7/1988 | Japan | ................................... 43/44.98 |
| 3175112 | 7/1988 | Japan | ................................... 43/44.98 |
| 1201515 | 8/1989 | Japan | ................................... 43/44.98 |
| 1201516 | 8/1989 | Japan | ................................... 43/44.98 |
| 2287865 | 10/1995 | United Kingdom . | |

OTHER PUBLICATIONS

"Orvis Catalog 1981," The Orvis Company, Manchester, pp. 36 & 38.
Derwent Publications Ltd., London, GB; Class A14; AN 88–343027 XP002014937 & JP 63 256 711 (Showa Denko KK), 24 Oct. 24, 1988 (Abstract).
Patent Astracts of Japan, vol. 6, No. 244, 2 Dec. 1982 & JP 57 143511 (Kureha Kagahu Kogyo), 4 Sep. 1982 (Abstract).

*Primary Examiner*—Kurt Rowan
*Attorney, Agent, or Firm*—Nixoin & Vanderhye

[57] ABSTRACT

Provided in the present invention are a leader for fly fishing comprising a monofilament of a vinylidene fluoride resin, said leader consisting of a butt section, a taper section and a tippet section, a diametral unevenness of the tippet section being less than 10%, and a process for producing such a leader for fly fishing. The leader for fly fishing according to the present invention has pliability to allow unrestricted movement of the fly and enough strength to withstand the impact of striking, and is also small in diametral unevenness and capable of having its curling disposition or kink easily straightened out.

9 Claims, 1 Drawing Sheet

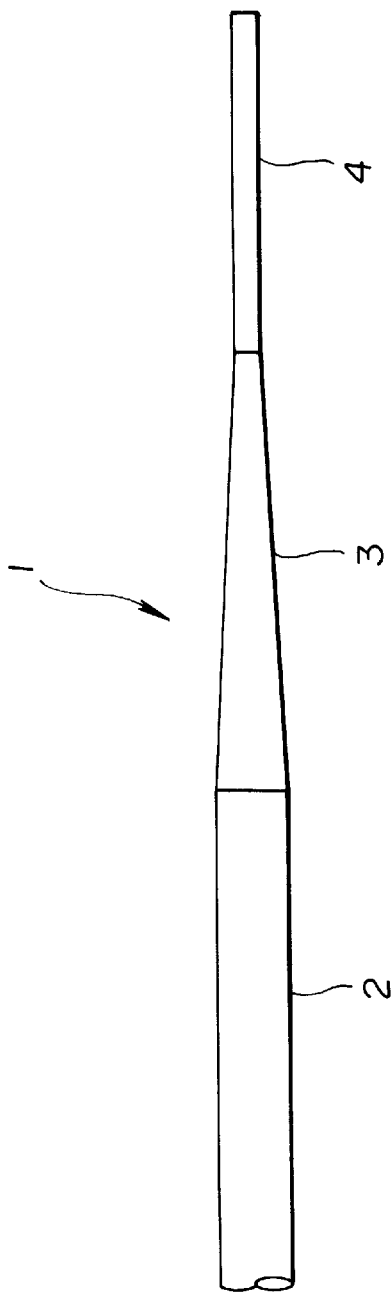

LEADER FOR FLY FISHING AND PROCESS FOR PRODUCING THE SAME

BACKGROUND OF THE INVENTION

The present invention relates to a leader for fly fishing composed of a vinylidene fluoride resin, which leader is very small in diametral unevenness at a tippet section and has enough strength to impart the impact of striking, and a process for producing such a leader.

Fly fishing is an art of fishing in which an angler casts a lure (fly) to a desired spot on the surface of the water, with neither sinker nor float attached to the line, from a distant place where the angler has little likelihood of being noticed by the fish, and tries to make the fly look like a real living thing to play the fish a trick, thereby hooking up the fish. In the fly fishing, it is imperative that (i) the fly is made look like a real living thing, and (ii) the fly is dropped quietly onto the surface of the water as if it were a real living thing to trick the fish into taking the fly.

In order to satisfy these requirements, use of the following five parts is indispensable in fly fishing: fly rod, reel, fly line, leader and fly.

Regarding the leader among these parts, it is preferable that the line size is made as small as possible for allowing natural drift of the line. Also, in order to let the fly drop quietly on the water surface, the leader is required to have a tapered portion for allowing smooth transfer of the inertia force from the fly line when the line is cast.

Therefore, the leader usually consists of a section called as a butt which is larger in diameter than other sections and is connected to the fly line, a section called as a taper which is a taper shape, and a small-diameter section called as a tippet where a fly is attached.

The leader is preferably made of a material having a refractive index close to that of water so as to minimize the possibility of the line being noticed by the fish. Vinylidene fluoride resins are exemplified as the material having a refractive index close to that of water. However, because of very high crystallization rate of the vinylidene fluoride resins, it has been difficult to obtain a tapered monofilament leader for fly fishing composed of a taper section and two sections different in diameter, that is, a butt section and a tippet section, and small in unevenness of diameter of the said sections, by using the said vinylidene fluoride resins.

Japanese Utility Model Application Laid-Open (Kokai) No. 3-10770 discloses a leader for ayu (sweetfish) fishing comprising a tapered monofilament of a synthetic resin. As the ordinary processes of producing a tapered monofilament composed of the synthetic resin, this Japanese Utility Model Application Laid-Open (Kokai) No. 3-10770 discloses a process in which a synthetic resin is melted, mixed up and spun out from a spinning nozzle of an extruder, with the discharge rate of the extrudate being varied with time, and a process in which a filament is melt spun in the usual way and the filament is drawn, varying the drawing rate. But this Japanese Utility Model Application Laid-Open (Kokai) No. 3-10770 is silent on the means for producing a tapered leader made of a vinylidene fluoride resin. It is to be noted that the leader for ayu fishing is small in length, usually 5 to 10 cm, so the diametral unevenness is also limited and poses no serious problem.

As stated above, the leader for fly fishing has a taper section, and it is preferable to make the diameter of the tippet as small as possible. However, since great stress is exerted to the tippet section when the line is tensed for fishing up, making the filament liable to break at the tippet section, its strength should be made as high as possible. It is further required that the diametral unevenness of the filament be as small as possible because if the diametral unevenness of the tippet section is large, stress is concentrated at a portion smaller in diameter, thereby elevating the possibility of the filament being snapped at this portion when the line is tensed.

Also, since the fly and the fly line are connected by the leader, it is important that each knot has sufficient strength to withstand the impact of striking. It is also important that the leader has pliability allowing unrestricted movement of the fly and that its curling-up tendency or kink can be easily straightened out. Fishline is usually sold in the form of a roll, so the angler is required to stretch the line with his both hands for smoothing out the curling-up disposition of the line. In this case, when the line is stretched, stress tends to be concentrated at the tippet section where the filament strength is lowest, thereby causing break of the line at this section. Thus, since no high tension can be applied to the line for fear of its break, it is difficult to get rid of the curling-up disposition of the line.

The sense of casting for dropping the fly quiently on the water surface is also an important factor for fly fishing. This sense of casting is affected by the arc generated by the fly line and the leader when the rod is swung to cast the line (this movement is called as turnover). This turnover is decided by the lengths of the fly line and the leader, and the lengths of the butt, taper and tippet sections which constitute the leader. Particularly the length of the leader and the lengths of its butt, taper and tippet sections are the important factors. A too high elongation of the leader is undesirable because the leader length is liable to change after every fishing up operation, thereby causing a change in the sense of casting. Also, when the leader is elongated at fishing up, the feeling of hauling up the fish is adversely affected.

Polyamide resin is used in most of the commercially available leaders for fly fishing. However, the leaders made of such polyamide resin have high elongation at the butt section, which is more than 2.5 times that of the tippet section. This causes an undesirable effect on the turnover.

As a result of the present inventors' studies for overcoming these problems of the prior art, it has been found that by passing a spun-out monofilament of a vinylidene fluoride resin through a coolant in a cooling bath, taking up the cooled filament by varying the taking-up rate, with a tippet section producing conditions being specified as: the time allowed for the extruded material to pass from the spinning nozzle to the surface of the coolant in the cooling bath=0.15 to 3.0 seconds; taking-up rate=not more than 14 m/min; and the product of the said passing time of the filament and taking-up rate=1.0 to 10.0, and drawing the resulting filament, the obtained leader for fly fishing consisting of a butt section, a taper section and the tippet section has the outstanding features that the diametral unevenness of the tippet section is not more than 10%, that the leader has high pliability allowing unrestricted movement of the fly, that the curling tendency of the leader can be easily straightened out, and that the leader has enough strength to withstand the impact of striking. The present invention has been attained on the basis of this finding.

SUMMARY OF THE INVENTION

An object of the present invention is to provide a leader for fly fishing made of a vinylidene fluoride resin, the said leader being small in unevenness of diameter, having pliability, capable of easily smoothing out the curling tendency and having enough strength to withstand the impact of striking.

Another object of the present invention is to provide a leader for fly fishing which is low in elongation.

Still another object of the present invention is to provide a process for producing the said leader for fly fishing composed of a vinylidene fluoride resin.

To accomplish the aims, in a first aspect of the present invention, there is provided a leader for fly fishing comprising a monofilament composed of a vinylidene fluoride resin, and said leader consisting of a butt section, a taper section and a tippet section, the diametral unevenness of the tippet section being not more than 10%.

In a second aspect of the present invention, there is provided a leader for fly fishing comprising a monofilament composed of a vinylidene fluoride resin, and said leader consisting of a butt section, a taper section and a tippet section, the diametral unevenness of the tippet section being not more than 10%, and the elongation of each of the butt section and the tippet section being not more than 65%.

In a third aspect of the present invention, there is provided a process for producing a leader for fly fishing comprising the steps of:

extruding a vinylidene fluoride resin from a spinning nozzle, passing the obtained monofilament through a coolant in a cooling bath, taking-up the cooled monofilament by varying the taking-up rate, with the taking-up of the tippet section being carried out under the following conditions: the time allowed for the extruded filament to pass from the spinning nozzle to the surface of the coolant in the cooling bath=0.15 to 3.0 seconds; filament taking-up rate=not more than 14 m/min; product of said time for passage of the filament and taking-up rate=1.0 to 10.0, and drawing the resulting filament.

BRIEF DESCRIPTION OF THE DRAWING

FIG. 1 is a side view of the leader for fly fishing according to the present invention.

DETAILED DESCRIPTION OF THE INVENTION

The present invention is described in detail below.

The leader for fly fishing (hereinafter referred to simply as leader) according to the present invention is a knotless tapered leader comprising a monofilament of a vinylidene fluoride resin.

The vinylidene fluoride resins usable as monofilament material in the present invention include vinylidene fluoride homopolymers, vinylidene fluoride copolymers and mixtures thereof.

The vinylidene fluoride resin used in the present invention is selected from those capable of providing pliability and strength required for a knotless tapered leader. Examples of the vinylidene fluoride resins which can satisfy such requirements are the copolymers composed of not more than 30 mol % of ethylene tetrafluoride, propylene sexafluoride, ethylene trifluoride, ethylene trifluorochloride, vinyl fluoride and the like. The said monomers may be used either singly or in combination. The inherent viscosity of the vinylidene fluoride resin used in the present invention is usually not less than 1.00, preferably in the range from 1.05 to 1.70.

Various additives such as plasticizer, heat stabilizer, acrylic resin, nucleating agent, lubricant, etc., may be mixed with the vinylidene fluoride resin.

For allowing smooth casting of the leader and accurate spotting of the fly, it is essential that the line used is capable of easy straightening of the curl or kink, and for this purpose, it can be recommended to add a plasticizer to the resin in an amount of not more than 10% by weight, preferably 1 to 10% by weight.

As the plasticizer to be added to the vinylidene fluoride resin, there can be used aliphatic polyesters, preferably aliphatic polyesters composed of aliphatic dialcohols having 2–4 carbon atoms and esters of aliphatic dicarboxylic acids having 2–6 carbon atoms, and aliphatic polyesters composed of 3- to 7-member-ring cyclic esters. Examples of the aliphatic dialcohols having 2–4 carbon atoms are ethylene glycol, propylene glycol, 1,4-butanediol, 1,2-butanediol and the like, and examples of the aliphatic dicarboxylic acids having 2–6 carbon atoms are oxalic acid, malonic acid, succinic acid, glutaric acid, adipic acid and the like. Examples of the 3- to 7-member-ring cyclic esters are β-propiolactone, γ-butyrolacktone, δ-valerolactone, ε-caprolactone and the like.

It is important that the diametral unevenness of the tippet section of the leader is not more than 10%. If such unevenness is more than 10%, stress is concentrated at the portion of the smallest diameter in the tippet section, which may result in a break of the filament, when the filament is tightened for fishing up. For obtaining a tippet section with high strength, it is necessary to spin and draw the obtained filament in the specific methods mentioned below, but when it is tried to obtain a tippet section with high strength, it is found difficult to suppress the diametral unevenness below 1%.

For making well-balanced setting to minimize the diametral unevenness of the tippet section while increasing its strength for preventing break of the filament at the tippet section on a specific occasion, the diametral unevenness of the tippet section needs to be confined within the range of usually 1 to 10%, preferably 1 to 6%, more preferably 1 to 4%.

The problem of break of the filament due to concentration of stress does not occur at the butt section since this section is more in diameter than the tippet section. However, if the diametral unevenness of the butt section exceeds 20%, the fly line may fail to generate a smooth arc when cast, and it may become difficult to cast the line to the desired spot. Therefore, the diametral unevenness of the butt section is preferably not more than 20%, more preferably 1 to 20%.

It is also preferable that the birefringence at the tippet section of the leader of the present invention falls in the range of usually $33 \times 10^{-3}$ to $40 \times 10^{-3}$, preferably $35 \times 10^{-3}$ to $40 \times 10^{-3}$. The more the birefringence of the filament, the more becomes the break strength thereof, but its knot strength lowers when the birefringence exceeds $40 \times 10^{-3}$. Since the birefringence is a parameter associated with the molecular orientation, the break strength elevates proportionally as the birefringence is enlarged. The knot strength also rises with increase of the birefringence, but it rather lowers when the birefringence becomes more than a certain value. This upper limit thereof is $40 \times 10^{-3}$ mentioned above.

It is preferable that the elongation of the butt section and the tippet section of the leader for fly fishing according to the present invention is not more than 65%. The elongation of the taper section is also preferably not more than 65%. If the elongation of the butt section and the tippet section is more than 65%, the length of the leader varies excessively after the fishing up operation, resulting in a variation of turnover of the line after used for fishing up, and this causes a change in the sense of casting. For obtaining a leader for fly fishing having a tensile strength inhibitive of break of the line when tensioned for fishing up and a high knot strength, it is necessary to incorporate a step of drawing the filament in the production process. But when it is tried to obtain a leader having high tensile strength and knot strength, it may be difficult to hold the elongation of the butt, taper and tippet sections below 20%.

For satisfying both requirements to eliminate the possibility of causing disorder feeling in the sense of casting and to prevent break of the line when hauled in for fishing up, the elongation of the butt, taper and tippet sections is preferably in the range from 20 to 65%, more preferably from 25 to 60%, respectively.

Also, the elongation of the butt section is preferably less than 2.5 times, more preferably not more than 2.0 times, even more preferably 1.1 to 1.8 times the elongation of the tippet section. If the elongation of the butt section is more than 2.5 times that of the tippet section, the length ratio of the butt, taper and tippet sections constituting the leader may vary before and after every fishing up operation. This exerts an effect on turnover, causing a disorder in the sense of casting.

FIG. 1 is a side view of an example of the leader according to the present invention. The leader 1 consists of a butt section 2 which is connected to a fly line, a taper section 3 which tapers down gently from the butt section, and a tippet section 4 where a fly is tied. In the present invention, these three sequential sections are made of a knotless monofilament of a vinylidene fluoride resin.

The diameter of the butt section is usually 300 to 800 μm, preferably 360 to 600 μm, and the diameter of the tippet section is usually 50 to 600 μm, preferably 70 to 500 μm. In a commonly used leader, the diametral ratio of the tippet section to the butt section is 0.1:1 to 0.7:1.

The length of the leader according to the present invention is usually 1.5 to 6.0 m, preferably 2.0 to 4.0 m, and the length ratio of the butt section:taper section:tippet section is usually 1:0.5–2.0:0.5–2.0, preferably 1:0.6– 1:0.6–1.5.

A process for producing the leader according to the present invention is described below. The vinylidene fluoride resins usable in the present invention have been mentioned above, but it is preferable to use a composition obtained by adding necessary substances such as plasticizer to the resin, mixing them by a suitable mixer such as ribbon blender, high-speed mixer (Henschel mixer), fixed V type blender, tumbler, ball mill, etc., further, if necessary, mixing the resultant mixture with proper additive or additives by a blender, and melt-kneading the obtained mixture by an extruder.

The melt-spinning temperature may be properly selected between the melting point of the vinylidene fluoride resin used and the thermal decomposition point thereof. However, for maintaining a stabilized spinning performance, it can be recommended to use a temperature in the range from 200° to 300° C., preferably from 230° to 280° C.

The resin melt-extruded from the spinning nozzle of the extruder is taken up with its taking-up rate and taking-up timing adjusted in conformity to the desired diameters of the butt and tippet sections to be formed. The taper section can be formed by gradually raising the taking-up rate from that for forming the butt section to that for forming the tippet section. The length of the taper section is decided by the time used for changing the taking-up rate from that for the butt section to that for the tippet section.

In the leader production process according to the present invention, the time allowed for the spun-out filament to pass from the spinning nozzle to the surface of the coolant in the cooling bath is 0.15 to 3.0 seconds. Since the vinylidene fluoride resins are very high in crystallization rate, the behavior from the molten state to the solid state differs from each section.

If the time allowed for the filament to pass from the spinning nozzle to the cooling bath in forming the tippet section is shorter than 0.15 second, the surface portion of the filament in the molten state becomes susceptible to the influence of the medium in the cooling bath, resulting in an enlarged diametral unevenness in filament. On the other hand, if the said time is longer than 3.0 seconds, the diametral unevenness of the filament is also enlarged since the period in which the filament of the molten state is left under the influence of taking-up tension is elongated.

From the viewpoint of improvement of strength of the tippet section, it is preferable that the said filament passage time from the spinning nozzle to the surface of the coolant in the cooling bath is not shorter than 0.4 second. If this time is shorter than 0.4 second, since the filament may be solidified rapidly from the molten state, it may become difficult to obtain a tapered filament with a large birefringence. It may become difficult to draw such a filament or, even if it could be drawn, it may become difficult to draw at a high draw ratio, so that there may not be obtained a leader having a high break strength and a high knot strength. Considering both evenness of filament diameter and strength, it can be recommended to set the filament passing time from the spinning nozzle to the cooling bath in the range from 0.4 to 3.0 seconds.

In the leader production process of the present invention, the taking-up rate of the filament is set to be not more than 14 m/min, preferably 1 to 10 m/min. If the taking-up rate is more than 14 m/min, the diametral unevenness of the tapered section is enlarged since the tension exerted to the filament in the molten state while passing from the spinning nozzle to the cooling bath is increased. Therefore, it is preferable that the product of the filament passing time (t) from the spinning nozzle to the cooling bath and the taking-up rate (V) falls in the range of 1.0 to 10.0, more preferably 1.2 to 8.

In the leader production process of the present invention, the filament passing time from the spinning nozzle to the surface of the coolant in the cooling bath can be adjusted by changing the distance between the spinning nozzle and the cooling bath, and the filament taking-up rate for forming the tippet section, and it can be properly selected within the above defined range. The distance (air gap) between the spinning nozzle and the surface of the coolant in the cooling bath is set to fall in the range of usually 20 to 300 mm, preferably 30 to 250 mm, more preferably 50 to 200 mm.

The vinylidene fluoride resin extruded in a molten state from the spinning nozzle passes through the air gap and enters the cooling bath where the extruded material is cooled and solidified. As coolant in the cooling bath, there can be used water, water containing an inorganic salt, alcohols, polyethylene glycol, glycerin or mixtures thereof. The cooling temperature is preferably selected from the range safe from producing air bubbles by boiling at the interface with the molten resin. For example, it is usually not more than 70° C., preferably not more than 40° C., in case the coolant is water.

The tapered filament of a vinylidene fluoride resin obtained in the manner described above according to the present invention is then drawn in a drawing bath at a drawing temperature of 90° to 300° C. As the heating medium in the drawing bath, there can be used liquid heating media such as boiling water and glycerin, and gaseous heating media such as air, steam and nitrogen gas. Glycerin is preferred. In case of using a liquid heating medium, the drawing temperature is preferably 90° to 175° C., and when glycerin is used, the drawing temperature is preferably 150° to 172° C., more preferably 165° to 169° C. In case a gaseous heating medium is used, the drawing temperature is preferably 150° to 300° C., more preferably 200° to 250° C.

Drawing of the tapered filament can be conducted either in a single stage or in two or more stages. From the viewpoint of improvement of break strength and knot strength, the total draw ratio is usually 4.0 to 7.0, preferably 4.5 to 6.5, more preferably 4.8 to 6.3.

The drawn filament is subjected to a heat-treatment for relaxation which is usually carried out at 90° to 180° C. for a relaxation percentage of usually 2 to 10%.

When the produced leader is to be used floating on the water surface, a water repellent agent or an oiling agent may be applied on the surface of the leader obtained in the manner described above.

The leader made of a vinylidene fluoride resin obtained according to the process of the present invention has properties that the diametral unevenness of the tippet section is less than 10%, the birefringence is $33 \times 10^{-3}$ to $40 \times 10^{-3}$, the break strength is not less than 55 kg/mm$^2$, preferably not less than 60 kg/mm$^2$, and the knot strength is not less than 45 kg/mm$^2$.

The leader for fly fishing according to the present invention has further properties that the elongation of the butt and tippet sections is not more than 65%, with the elongation of the butt section being less than 2.5 times that of the tippet section. Further, the leader of the present invention causes no change of the sense of casting of the line, has high break strength as well as high knot strength, and is highly resistant to break.

As is understood from the foregoing explanation, the leader of the present invention has pliability which allows unrestriction to movement of the fly, is capable of easily straightening out any curling inclination, is very small in diametral unevenness of the tippet section and has enough strength to withstand the impact of striking.

EXAMPLES

The present invention is further illustrated by the following examples. It should be understood, however, that these examples are merely intended to be illustrative and not to be construed as limiting the scope of the invention in any way.

<Evaluation methods>

(1) Filament diameter

The filament diameter was measured using an outside diameter (OD) meter (a laser OD meter LS-3100 manufactured by KEYENCE Co., Ltd.) with the filament run at a speed of 2 m/min. The average value of the maximum diameter and the minimum diameter of the tippet section or the average value of the maximum diameter and the minimum diameter of the butt section of the filament measured by the said meter was represented as diameter of the tippet section or the butt section of the filament.

(2) Diametral unevenness of the filament

The filament diameter was measured in the same method as described above. The maximum diameter and the minimum diameter of the tippet section or the maximum diameter and the minimum diameter of the butt section of the filament were read from the meter, and the degree of diametral unevenness of the tippet section or the butt section was calculated from the following equation:

(Degree of diametral unevenness)=(maximum diameter−minimum diameter)/[(maximum diameter+minimum diameter)×½]×100 (%)

(3) Birefringence

Determined by the retardation method using a polarization microscope (BH-2, manufactured by Olympus Corp.) having a Berek type compensator at 23° C. with the D-line of sodium as light source by a retardation method.

(4) Knot strength

A one-ply knot was made at the tippet section of each of the ten samples of leader and the knot tenacity was measured using a tension tester (Tensilon UTM-III-100 manufactured by Orientec Co., Ltd.) under the conditions of: sample length=30 cm, temperature=23° C. and pulling rate=300 mm/min. Knot strength was determined by dividing the measured value of knot tenacity by the average diameter of the tippet section of the filament.

(5) Break strength

Breaking tenacity at the tippet section of each of the ten samples of leader was determined using the said tensile tester (Tensilon UTM-III-100) under the conditions of: sample length=30 cm, temperature=23° C. and pulling rate= 300 mm/min. Break strength was determined by dividing the measured value of breaking tenacity by the average diameter of the tippet section of the filament.

(6) Curl straightenability

A 10-monitor field test was conducted, and the filament's readiness to straighten out curling disposition was evaluated according to the following three criterion:

○: easy to straighten

Δ: rather easy to straighten

X: hard to straighten

The most many ratings in the 10-monitor evaluation were adapted as the rating of the curl straightenability.

The leader is required to have a curl straightenability of ○ from the point of view of practical application.

(7) Elongation

Elongation at break was measured on ten samples of leader using the above-mentioned tensile tester (Tensilon UTM-III-100) under the conditions of: sample length=30 cm, temperature=23° C. and pulling rate=300 mm/min. Each of the leaders for fly fishing obtained in the following Examples was divided into the butt section and the tippet section, and elongation of each of the said sections was determined.

(8) Sense of casting 4 persons from each of the five groups of anglers divided according to the number of years of experience of fly fishing, namely the angler groups with 0–1 year, 1–3 years, 3–5 years, 5–10 years and more than 10 years of experience of fly fishing, respectively, were asked to compare (i) the sense of casting they had when made a turnover with a rod having a leader for fly fishing obtained in each of the following Examples, with a fly line and a fly attached thereof, and (ii) the sense of casting they had when made a turnover with a rod having the used leader stretched to an extent just before break of the leader would occur, with a fly line and a fly attached thereto. Regarding the turnover, rating was made according to the following three criterion:

○: There was no difference in feeling of turnover between (i) and (ii).

○: Feeling of turnover was slightly different between (i) and (ii), but there was no sense of alienation.

X: Feeling of turnover was different between (i) and (ii).

The leader is required to have a sense of casting of ○ or Δ from the point of view of practical application.

Examples 1–6 and Comparative Examples 1–3

To 100 parts by weight of a vinylidene fluoride resin (KF#1100 produced by Kureha Kagaku Kogyo Kabushiki Kaisha) was added 2 parts by weight of a polyester plasticizer (an aliphatic polyester composed of an aliphatic diol of propylene glycol and butanediol, and an aliphatic dicarboxylic acid of adipic acid), and they were mixed by a Henschel mixer and pelletized by using an extruder with a bore diameter of 35 mmφ. No polyester plasticizer was added in Comparative Example 3.

The pellets were extruded from a nozzle with 1.3 mm six-holes at a temperature of 280° C. at a constant rate of 2.3 g/min, passed through water (40° C.) in a cooling bath with the air gap (distance of the spinning nozzle tip to the surface of water in the cooling bath) shown in Table 1, and taken up by pinch rolls. The taking-up operation was conducted using a vector inverter motor according to a formula in which the extrudate was first taken up at a rate of A shown in Table 1 for 60 seconds (for forming a butt section), then the taking-up rate A was changed to the taking-up rate B shown in Table 1 in a span of one second (for forming a taper section), continuing the taking-up operation at the taking-up rate B for 30 seconds (for forming a tippet section), and thereafter the taking-up rate B was again changed to the taking-up rate A in a span of one second (for forming another taper section). This taking-up operation of this formula was carried on cyclically to obtain a tapered non-stretched filament.

This tapered non-stretched filament was drawn 5.6 times in a 169° C. glycerin bath, then subjected to a 120° C. dry heat-treatment for 3% relaxation, and cut so that the butt section and the tippet section would each have a length of 1 m to obtain a leader.

The lengths of the butt, taper and tippet sections of each of the obtained leaders, and the diameters of the respective sections, diametral unevenness, birefringence, knot strength, break strength and curl straightenability of the obtained leaders, as determined by the methods described above, are shown in Table 1.

Example 7

To 100 parts by weight of a vinylidene fluoride resin (KF#1100 produced by Kureha Kagaku Kogyo Kabushiki Kaisha) was added 2 parts by weight of a polyester plasticizer (an aliphatic polyester composed of an aliphatic diol of propylene glycol and butanediol, and an aliphatic dicarboxylic acid of adipic acid), and they were mixed by a Henschel mixer and pelletized by using a 35 mm bore extruder. The pellets were extruded from a nozzle with 1.3 mm six-holes of a temperature of 280° C. at a constant rate of 2.3 g/min, with the distance from the nozzle tip to the surface of water as a coolant in the cooling bath being adjusted to be 100 mm and the cooling temperature controlled at 40° C., and taken up by pinch rolls.

The taking-up operation was conducted using a vector inverter motor according to the same method as used in the preceding examples. The taking-up operation was carried on cyclically to obtain a tapered non-stretched filament.

This tapered non-stretched filament was stretched 5.4 times in a 169° C. glycerin bath, then subjected to a 120° C. dry heat-treatment for 3% relaxation, and cut the obtained filament so that the butt section and the tippet section would each have a length of one meter to obtained a tapered leader.

The lengths of the butt and tippet sections of the obtained leader, and the diameters of the respective sections, elongation, birefringence, knot strength and tensile strength of the obtained leader, as determined by the above-described methods, are shown in Table 1.

|  | Air Gap (min) | Taking-up Rate A (m/min) | Taking-up Rate B (m/min) | Residence Time in Air Gap for Tippet section (sec) |
| --- | --- | --- | --- | --- |
| Ex. 1 | 20 | 1.7 | 6.1 | 0.20 |
| Ex. 2 | 20 | 1.7 | 8.0 | 0.15 |
| Ex. 3 | 100 | 1.7 | 5.0 | 1.20 |
| Ex. 4 | 100 | 1.7 | 6.5 | 0.92 |
| Ex. 5 | 50 | 1.7 | 6.0 | 0.50 |
| Ex. 6 | 100 | 1.7 | 9.5 | 0.63 |
| Ex. 7 | 100 | 1.7 | 5.0 | 1.20 |
| Compa. Ex. 1 | 20 | 1.7 | 10 | 0.12 |
| Compa. Ex. 2 | 100 | 1.7 | 15 | 0.40 |
| Compa. Ex. 3 | 200 | 1.7 | 3.7 | 3.24 |

| | Butt Section | | | | |
| --- | --- | --- | --- | --- | --- |
|  | Length (cm) | Average Diameter (μm) | Diametral Unevenness (%) | Knot Strength (kg/mm²) | Break Strength (kg/mm²) |
| Ex. 1 | 100 | 400 | 17 | 45 | 55 |
| Ex. 2 | 100 | 400 | 17 | 43 | 52 |
| Ex. 3 | 100 | 400 | 10 | 55 | 70 |
| Ex. 4 | 100 | 400 | 10 | 52 | 60 |
| Ex. 5 | 100 | 400 | 15 | 48 | 55 |
| Ex. 6 | 100 | 400 | 10 | 52 | 61 |
| Ex. 7 | 100 | 435 | 12 | 48 | 58 |
| Compa. Ex. 1 | 100 | 400 | 70 | 38 | 50 |
| Compa. Ex. 2 | 100 | 400 | 30 | 48 | 52 |
| Compa. Ex. 3 | 100 | 400 | 15 | 51 | 53 |

| | Butt Section | Taper | Tippet Section | | |
| --- | --- | --- | --- | --- | --- |
|  | Elongation (I) (%) | Section Length (cm) | Length (cm) | Average Diameter (μm) | Diametral Unevenness (%) |
| Ex. 1 | 45 | 75 | 100 | 210 | 3 |
| Ex. 2 | 43 | 95 | 100 | 182 | 6 |
| Ex. 3 | 45 | 67 | 100 | 230 | 9 |
| Ex. 4 | 53 | 81 | 100 | 200 | 3 |
| Ex. 5 | 49 | 67 | 100 | 210 | 4 |
| Ex. 6 | 48 | 106 | 100 | 167 | 5 |
| Ex. 7 | 40 | 67 | 100 | 180 | 9 |
| Compa. Ex. 1 | 42 | 110 | 100 | 163 | 60 |
| Compa. Ex. 2 | 48 | 150 | 100 | 133 | 25 |
| Compa. Ex. 3 | 55 | 60 | 100 | 268 | 35 |

|  | Tippet Section | | | |
| --- | --- | --- | --- | --- |
|  | Birefringence ($\times 10^3$) | Knot Strength (kg/mm$^2$) | Break Strength (kg/mm$^2$) | Elongation (I) (%) |
| Ex. 1 | 36 | 47 | 71 | 25 |
| Ex. 2 | 36 | 47 | 73 | 22 |
| Ex. 3 | 38 | 63 | 85 | 33 |
| Ex. 4 | 38 | 60 | 83 | 35 |
| Ex. 5 | 37 | 50 | 78 | 30 |
| Ex. 6 | 38 | 58 | 82 | 28 |
| Ex. 7 | 34 | 63 | 85 | 30 |
| Compa. Ex. 1 | 36 | 35 | 54 | 22 |
| Compa. Ex. 2 | 36 | 40 | 59 | 29 |
| Compa. Ex. 3 | 36 | 40 | 58 | 39 |

|  | Curl Straightenability | Ratio of Elongation of Butt Section to Elongation of Tippet Section | Sense of Casting |
| --- | --- | --- | --- |
| Ex. 1 | ○ | 1.80 | ○ |
| Ex. 2 | ○ | 1.95 | ○ |
| Ex. 3 | ○ | 1.36 | Δ |
| Ex. 4 | ○ | 1.51 | Δ |
| Ex. 5 | ○ | 1.63 | Δ |
| Ex. 6 | ○ | 1.71 | Δ |
| Ex. 7 | ○ | 1.33 | ○ |
| Compa. Ex. 1 | x | 1.91 | x |
| Compa. Ex. 2 | Δ | 1.66 | x |
| Compa. Ex. 3 | Δ | 1.41 | Δ |

What is claimed is:

1. A leader for fly fishing consisting of a butt section, a taper section and a tippet section, which comprises a monofilament of a vinylidene fluoride resin, wherein the elongation of each of the butt section and the tippet section is less than 65%, the elongation of the butt section is not more than 2.5 times that of the tippet section, the diametral unevenness of the tippet section is less than 10%, and the diametral unevenness of the butt section is less than 20%.

2. A leader for fly fishing according to claim 1, wherein the vinylidene fluoride resin has an inherent viscosity of not less than 1.00.

3. A leader for fly fishing according to claim 1, wherein the vinylidene fluoride resin contains as a plasticizer aliphatic polyesters.

4. A leader for fly fishing according to claim 1, wherein the amount of the added plasticizer is not more than 10% by weight.

5. A leader for fly fishing according to claim 1, wherein the birefringence of the tippet section is $33 \times 10^{-3}$ to $40 \times 10^{-3}$.

6. A leader for fly fishing according to claim 1, wherein the elongation of each of the butt section and the tippet section is 20 to 65%.

7. A leader for fly fishing according to claim 1, having a break strength of not less than 55 kg/m$^2$ and a knot strength of not less than 45 kg/m$^2$.

8. A leader for fly fishing according to claim 1, wherein a diameter of the butt section is 300 to 800 μm, a diameter of the tippet section is 50 to 600 μm.

9. A leader for fly fishing according to claim 1, wherein the leader length is 1.5 to 6.0 m, and a length ratio of the butt section:taper section:tippet section is 1.0:0.5–2.0:0.5–2.0.

* * * * *